(12) United States Patent
Carus et al.

(10) Patent No.: US 7,558,778 B2
(45) Date of Patent: Jul. 7, 2009

(54) SEMANTIC EXPLORATION AND DISCOVERY

(75) Inventors: Alwin B. Carus, Waban, MA (US); Thomas J. DePlonty, Melrose, MA (US)

(73) Assignee: Information Extraction Systems, Inc., Waban, MA (US)

( * ) Notice: Subject to any disclaimer, the term of this patent is extended or adjusted under 35 U.S.C. 154(b) by 201 days.

(21) Appl. No.: 11/820,677

(22) Filed: Jun. 20, 2007

(65) Prior Publication Data

US 2008/0010274 A1 Jan. 10, 2008

Related U.S. Application Data

(60) Provisional application No. 60/815,431, filed on Jun. 21, 2006.

(51) Int. Cl.
*G06F 17/30* (2006.01)
(52) U.S. Cl. .................. 707/1; 707/3; 707/100; 704/9; 704/257; 700/246
(58) Field of Classification Search .................. 707/1–5, 707/100, 101; 700/246; 704/9, 257
See application file for complete search history.

(56) References Cited

U.S. PATENT DOCUMENTS

| | | | |
|---|---|---|---|
| 6,606,625 B1 | 8/2003 | Muslea et al. | |
| 6,714,941 B1 | 3/2004 | Lerman et al. | |
| 6,728,707 B1 | 4/2004 | Wakefield et al. | |
| 6,732,097 B1 | 5/2004 | Wakefield et al. | |
| 6,732,098 B1 | 5/2004 | Wakefield et al. | |
| 6,738,765 B1 | 5/2004 | Wakefield et al. | |
| 6,741,988 B1 | 5/2004 | Wakefield et al. | |
| 7,139,752 B2 | 12/2004 | Broder et al. | |
| 7,146,361 B2 | 12/2006 | Broder et al. | |
| 7,483,892 B1* | 1/2009 | Sommer et al. | 707/5 |
| 2003/0028564 A1* | 2/2003 | Sanfilippo | 707/513 |

(Continued)

OTHER PUBLICATIONS

Huang, Applying Associative Retrieval Techniques to Alleviate the Sparsity Problem in Collaborative Filtering, ACM Transactions on Information Systems, vol. 22, No. 1, Jan. 2004, pp. 116-142.

(Continued)

*Primary Examiner*—Cheryl Lewis
(74) *Attorney, Agent, or Firm*—The Law Offices of Anthony L. Meola

(57) ABSTRACT

A semantic discovery and exploration system is disclosed where an environment enabling a developer or user to uncover, navigate, and organize semantic patterns and structures in a document collection with or without the aid of structured knowledge. The semantic discovery and exploration system provides techniques for searching document collections, categorizing documents, inducing lists of related concepts, and identifying clusters of related terms and documents. This system operates both without and with infusions of structured knowledge such as gazetteers, thesauruses, taxonomies and ontologies. System performance improves when structured knowledge is incorporated. The semantic discovery and exploration system may be used as a first step in developing an information extraction system such as to categorize or cluster documents in a particular domain or to develop gazetteers and as a part of a deployed run-time information extraction system. It may also be used as standalone utility for searching, navigating, and organizing document collections and structured knowledge bases such as dictionaries or domain-specific reference works.

20 Claims, 5 Drawing Sheets

U.S. PATENT DOCUMENTS

| | | |
|---|---|---|
| 2004/0167870 A1 | 8/2004 | Wakefield et al. |
| 2004/0167883 A1 | 8/2004 | Wakefield et al. |
| 2004/0167884 A1 | 8/2004 | Wakefield et al. |
| 2004/0167885 A1 | 8/2004 | Wakefield et al. |
| 2004/0167886 A1 | 8/2004 | Wakefield et al. |
| 2004/0167887 A1 | 8/2004 | Wakefield et al. |
| 2004/0167907 A1 | 8/2004 | Wakefield et al. |
| 2004/0167908 A1 | 8/2004 | Wakefield et al. |
| 2004/0167909 A1 | 8/2004 | Wakefield et al. |
| 2004/0167910 A1 | 8/2004 | Wakefield et al. |
| 2004/0167911 A1 | 8/2004 | Wakefield et al. |
| 2004/0215634 A1 | 10/2004 | Wakefield et al. |
| 2004/0243554 A1 | 12/2004 | Broder et al. |
| 2004/0243556 A1 | 12/2004 | Ferrucci et al. |
| 2004/0243560 A1 | 12/2004 | Broder et al. |
| 2005/0027664 A1 | 2/2005 | Johnson et al. |
| 2005/0071217 A1 | 3/2005 | Hoogs et al. |
| 2005/0108256 A1 | 5/2005 | Wakefield et al. |
| 2005/0165789 A1 | 7/2005 | Minton et al. |
| 2007/0294200 A1* | 12/2007 | Au ............................. 706/55 |

OTHER PUBLICATIONS

Sibler, Efficiently Computed Lexical Chains as an Intermediate Representation for Automatic Text Summarization, Association for Computational Linguistics, vol. 28, 2002.

Chen, An Alorithmic Approach to Concept Exploration in a Large Knowledge Network (Automatic Thesaurus Consultation): Symbolic Branch and Bound Search vs. Connectionist Hopfield Net Activation, Journal of the American Society for Information Science, vol. 46 No. 5, pp. 348-369, 1995.

Day, Mixed Initiative Development of Language Processing Systems, 1999, Advanced Information Center, The MITRE Corporation, Bedford MA.

Shen, Multi-Criteria-based Active Learning for Named Entity Recognition, Universität des Saarlandes, Computational Linguistics Dept., 66041 Saarbrücken, Germany, dshen@coli.uni-sb.de.

Bonino, Ontology Driven Semantic Search, Dipartimento di Automatica ed Informatica Corso Duca degli Abruzzi, 10129 Torino Italy, 2004.

Becker, Optimising Selective Sampling for Bootstrapping Named Entity Recognition, Proceedings of the Workshop on Learning with MultipleViews, 22 nd ICML, Bonn, Germany, 2005.

Seung, Query by Committee, Racah Institute of Physics and Center for Neural Computation Hebrew University Jerusalem, Israel, 1992.

Crestani, Retrieving Documents By Constrained Spreading Activation on Automatically Constructed Hypertexts, Department of Computing Science University of Glasgow Glasgow G12 8QQ, Scotland, 1999.

Wolverton, Retrieving Semantically Distant Analogies with Knowledge-Directed Spreading Activation, Knowledge Systems Laboratory, Stanford University, Palo Alto, CA 1997.

NGAI, Rule Writing or Annotation: Cost Efficient Resource Usage for Base Noun Phrase Chunking, Department of Computer Science, The Johns Hopkins University, Baltimore, MD 2000.

HWA, Sample Selection for Statistical Grammar Induction, Division of Engineering and Applied Sciences, Harvard University, 2000.

HWA, Sample Selection for Statistical Parsing, University of Pittsburgh, Computational Linguistics, 2002.

Preece, Retrieval, Oct. 1991.

Crestani, Searching the Web by Constrained Spreading Activation, Department of Computing Science University of Glasgow Glasgow G12 8QQ, Scotland, 2000.

Kozima, Segmenting Narrative Text into Coherent Scenes, Department of Computer Science, University of Electro Communications, Tokyo, Japan 1994.

Freund, Selective Sampling Using the Query by Committee Algorithm, Machine Learning 28, pp. 133-168, 1997.

Muslea, Selective Sampling With Redundant Views, 2000, American Association for Artificial Intelligence.

Medelyan, Semantically Enhanced Automatic Keyphrase Indexing, a PhD Full Research Proposal, Jul. 30, 2006.

Guha, Semantic Search,IBM Research, Almaden, Budapest, Hungary, 2003.

Sibler, An Efficient Text Summarizer Using Lexical Chains, Computer and Information Sciences, University of Delaware.

Kozima, Similarity Between Words Computed by Spreading Activation on an English Dictionary, Department of Computer Science, University of Electro Communicatons, Tokyo, Japan.

Ngai, Text Classification from Labeled and Unlabeled Documents using EM, Machine Learning, pp. 1-34, Kluwer Academic Publishers, Boston, Manufactured in The Netherlands, Mar. 15, 1998.

Brunn, Text Summarization Using Lexical Chains, Department of Mathematics and Computer Science University of Lethbridge, 4401 University Drive, Lethbridge, Alberta, Canada.

Medelyan, Thesaurus Based Automatic Keyphrase Indexing, JCDL, Jun. 2006, Chapel Hill, North Carolina, USA.

Medelyan, Thesaurus-Based Index Term Extraction for Agricultural Documents, Department of Computer Science, The University of Waikato, Private Bag 3105, Hamilton, New Zealand.

Cao, Uncertainty Reduction in Collaborative Bootstrapping: Measure and Algorithm, Microsoft Research Asia 5F Sigma Center, No. 49 Zhichun Road, Haidian Beijing, China, 2000.

Yabney, Understanding the Yarowsky Algorithm, Association for Computational Linguistics 2004.

Yangarber, Unsupervised Discovery of Scenario-Level Patterns for Information Extraction, Courant Institute of Mathematical Sciences, New York University.

Yangarber, Unsupervised Learning of Generalized Names, In Proceedings of the 19th International Conference on Computational Linguistics (Coling 2002).

Collins, Unsupervised Models for Named Entity Classification Michael Collins and Yoram Singer, AT&T Labs-Research, 180 Park Avenue, Florham Park, NJ, 1999.

Yarosky, Unsupervised Word Sense Disambiguation Rivaling Supervised Methods, Department of Computer and Information Science, University of Pennsylvania.

Riloff, Using Learned Extraction Patterns for Text Classification, Connecticut Statistical and Symbolic Approaches to Learning Nautral Language Processing, pp. 275-289, 1996.

Barzilay, Using Lexical Chains for Text Summarization, Mathematics and Computer Science Department, Ben Gurron University, Israel, 1997.

Ng, Weakly Supervised Natural Language Learning Without Redundant Views, Department of Computer Science Cornell University, Ithaca, New York.

Crestani, WebSCSA: Web Search by Constrained Spreading Activation, Department of Computing Science University of Glasgow Glasgow G12 8QQ, Scotland, UK.

Tsatsaroni, Word Sense Disambiguation with Spreading Activation Networks Generated from Thesauri, PENED 2003 Programme of the EU and the Greek General Secretariat for Research and Technology.

Bennett, Learning to Tag Multilingual Texts Through Observation, pp. 109-116, 1999.

Seeger, Learning with Labelled and Unlabelled Data, Dec. 19, 1992, Institute for Adaptive and Neural Computation, University of Edinburgh, 5 Forest Hill, Edinburgh.

Schonn, Less is More, Active Learning with Support Vector Machines, Just Research, 416 Henry Street, Pittsburgh, PA.

McCarthy, Lexical Chains.

Morris, Lexical Cohesion Computed by Thesaural Relations as an Indicator of the Structure of the Text, 1991, Association for Computational Linguisitics, vol. 17, No. 1.

Pierce, Limitations of Co-Training for Natural Language Learning from Large Datasets, Proceedings on the 2001 Conference on Empirical Methods in Natural Language Processing.

Riloff, Little Words Can Make a Big Difference for Text Classification, Proceedings of the 18th Annual International ACM SIGIR Conference on Research and Development in Information Retrieval, pp. 130- 136.

Brill, Man vs. Machine, A Case Study in Base Noun Phase Learning, Department of Computer Science, The Johns Hopkins University.

Dempster, Maximum Likelihood from Incomplete Data via the EM Algorithm, Journal of Royal Statistical Society, Series B Methodological, vol. 39, No. 1 (1977), pp. 1 -38.
Engelson, Minimizing Manual Annotation Cost in Supervised Training From Corpora, Department of mathematics and Computer Science, Bar-Illan University, 52900, Ramat Gan Israel.
Shen, A Collaborative Ability Measurement for Co-Training, Institute for Infocomm. Technology, 2004.
Dr. Dieter MERKL, Activation on the Move: Adaptive Information Retrieval via Spreading Activation; Institut f ur Softwaretechnik, 2003.
Jones, Active Learning for Information Extraction with Multiple View Feature Sets, School of Computer Science, Carnegie Mellon University.
Thompson, Active Learning for Natural Language Parsing and Information Extraction, Appears in Proceedings of the Sixteenth International Machine Learning Conference, pp. 406-414, Bled, Slovenia, Jun. 1999.
Tang, Active Learning for Statistical Natural Language Parsing, Spoken Language Systems Group MIT Laboratory for Computer Science Cambridge, Massachusetts, 2002.
Finn, Active Learning Selection Strategies for Information Extraction Smart Media Institute, Computer Science Department, University College Dublin, Ireland.
Liere, Active Learning with Committees for Text Categorization, American Association for Artificial Intelligence, 1997.
Rocha, A Hybrid Approach for Searching in the Semantic Web, Dept. of Informatics, PUC-Rio and Milestone—I.T. Rua Marquâs de São Vicente 225 Prédio Gênesis, Sala 21b Rio de Janeiro, RJ 22453-900, Brasil, May 17, 2004.
Day, The Alembic Workbench Environment for Natural Language Engineering, A National Resource Working in the Public Interest, the MITRE Corporation, 1997.
Merkl, An Adaptive Information Retrieval System based on Associative Networks Copyright, Australian Computer Society, Inc. First Asia-Pacific Conference on Conceptual Modelling, 2004.
Chen, An Algorithmic Approach to Concept Exploration in a Large knowledge Network (Automatic Thesaurus Consultation): Journal of the American Society for Information Science. 46(5):348-369, 1995.
Nigram, Analyzing the Effectiveness and Applicability of Cotraining School of Computer Science Carnegie Mellon University Pittsburgh, PA 15213.
Riloff, An Empirical Approach to Conceptual Case Frame Acquisition, The Sixth Workshop on Very Large Corpora, 1998.
Riloff, An Empirical Study of Automated Dictionary Construction for Information Extraction in Three Domains, Al Journal, El Sevier Publishers, 1996.
Riloff, An Introduction to the Sundance and AutoSlog Systems, Nov. 8, 2004.
Crestani, Application of Spreading Activation Techniques in Information Retrieval, Dipartimento di Elettronica e Informatica, Universit'a di Padova, Padova, Italy.sa.tex; Dec. 19, 1995; 14:37;No. v.
Huangacm, Applying Associative Retrieval Techniques to Alleviate the Sparsity Problem in Collaborative Filtering Transactions on Information Systems, vol. 22, No. 1, Jan. 2004, pp. 116-142.
Stevenson, A Semantic Approach to IE Pattern Induction, Proceedings of the 43rd Annual Meeting of the ACL, pp. 379-386, Jun. 2005. Association for Computational Linguistic.
Lewis, A Sequential Algorthim for Training Text Classifiers, SIGIR 94, pp. 3 - 12, 1994.
Yangarber, Automatic Acquisition of Domain Knowledge for Information Extraction, Proceedings of the 18th International Conference on Computational Linguistic, 2000.
Rhiloff, Automatically Constructing a Dictionary for Information Extraction Tasks, Proceedings of the Eleventh National Conference on Artificial Intelligence, 1993, AAAI Press / MIT Press, pp. 811-816.
Rhiloff, Automatically Generating Extraction Patterns from Untagged Text, Proceedings of the Thirteenth National Conference on Artificial Intelligence, 1996, pp. 1044-1049.
Reeve, BioChain: Lexical Chaining Methods for Biomedical Text Summarization, SAC'06, Apr., 23-27, 2006, Dijon, France.
Abney, Bootstrapping, AT&T Laboratories—Reasearch 180 Park Avenue, Florham Park, NJ, USA, 2002.
Lin, Bootstrapped Learning of Semantic Classes from Positive and Negative Examples, Proceedings of the ICML-2003 Workshop on The Continuum from Labeled to Unlabeled Data, Washington DC, 2003.
Blum, Combining Labeled and Unlabeled Data with Co-Training, Proceedings of the Conference on Computational Learning Theory, 1998.
Dagan, Committee Based Sample Selection for Probabilistic Classifiers, Journal of Al Research, pp. 355-360, 1999.
Dagan, Committee Based Sampling for Probabilistic Classifiers.
Doran, Comparing Lexical Chain-based Summarisation Approaches Using an Extrinsic Evaluation, Eds., GWC 2004, Proceedings, pp. 112-117. Masaryk University, Brno, 2003.
Aleman-Meza, Context-Aware Semantic Association Ranking, Semantic Web and Databases Workshop Proceedings. Berlin, Sep. 2003.
Bean, Corpus Based Identification of Non-Anaphoric of Noun Phrases, Proceedings of the 37th Annual Meeting of the Association for Computational Linguistics (ACL-99) pp. 373-380.
Yangarber, Counter-Training in Discovery of Semantic Patterns, Proceedings of the 41st Annual Meeting of the Association for Computational Linguistics (ACL 2003).
Sibler, Efficiently Computed Lexical Chains as an Intermediate Representation for Automatic Text Summarization, Association for Computational Linguistics, 2002.
Sibler, An Efficient Text Summarizer Using Lexical Chains, 2000.
McCallum, Employing EM and Pool Based Active Learning for Text Classification.
Goldman, Enhancing Supervised Learning with Unlabeled Data, Department of Computer Science, Washington University.
Steedman, Example Selection for Bootstrapping Statistical Parsers, Main Papers, pp. 157-164 Proceedings of HLT-NAACL 2003.
Yangarber, Extraction Pattern Discovery through Corpus Analysis, Computer Science Department, New York University.
Kenter, Using Gate as an Annotation Tool, Jan. 28, 2005.
Tablan, Gate—An application Developer's Guide, Department of Computer Science, University of Sheffield, UK, Jul. 19, 2004.
Cunningham, Developing Language Processing Components, Jul. 2007.
Lewis, Heterogeneous Uncertainty Sampling for Supervised Learning, Machine Learning: Proceedings of the Eleventh International Conference, Morgan Kaufmann Publishers, San Francisco, CA, pp. 148-156.
IBM, An Open Industrial Strength for Platform Unstructured Information Analysis and Search, 2005.
Cohn, Improving Generalization with Active Learning, Machine Learning, 1990.
Brinker, Incorporating Diversity in Active Learning with Support Vector Machines, Proceedings of the Twentieth International Conference on Machine Learning (ICML-2003), Washington DC, 2003.
Yangarber, Information Extraction from Epidemiological Reports, Department of Computer Science, University of Helsinki, Finland, 2004.
Shi, Intimate Learning: A Novel Approach for Combining Labelled and Unlabelled Data, School of Computing Science, Simon Fraser University, Canada.
Hachey, Investigating the Effects of Selective Sampling on the Annotation Task, School of Informatics University of Edinburgh Edinburgh, EH8 9LW, UK.
Riloff, Learning Dictionaries for Information Extraction by Multi-Level Bootstrapping, American Association for Artificial Intelligence, 1999.
Blum, Learning From Lablelled and UnLabelled Data Using Graphics Mincuts, Computer Science Department, Camegie Mellon University, 2001.
Andrew McCallum, Queue—Information Extraction, University of Massachusetts, Amherst, USA, 2006.
Andrew McCallum, Queue—Information Extraction, ACM Queue, pp. 48-47, University of Massachusetts, Amherst, USA, Nov. 2005.

Karanikas, Knowledge Discovery in text and Test Mining Software, Centre for Research in Information Management, Department of Computation, MIST, Manchester, UK.

Soderland, Learning Information Extraction Rules for Semi-Strucutred and Free Text, Machine Learning, 1997, pp. 1-44, Kluwer Academic Publishers, Boston, USA.

Liere, Active Learning with Committees for Text Categorization, American Association for Artifical Intelleigence, 1997, Dept. of Computer Science, Oregon State University, USA.

Day, Mixed-Initiative Development of Lanuage Processing Systems, 1997 Advanced Information Systems Center, the MITRE Corporation, Bedford MA.

Bennett, Learning to Tag Multilingual Texts Through Observation, 1998, pp. 109-116, SRA International, Fairfax, Virginia, USA.

Lewis, Heterogensous Uncertainty Sampling for . . . Machine Learning: Proceedings of the Eleventh Int'l Conf., pp. 148-156, Morgan Kaufman Publishers, San Franciso, CA.

Freund, Selective Sampling Using the Query by Committee Algorithm, Machine Learning: 28, 133-168, 1997, Kluwer Academic Publishers, The Netherlands.

Cohn, Improving Generalization with Active Learning, Machine Leraning 15, pp. 201-221, 1992.

* cited by examiner

SEMANTIC EXPLORATION AND DISCOVERY

CROSS REFERENCE TO RELATED APPLICATIONS

The present application relates to and takes priority from U.S. provisional application Ser. No. 60/815,431, filed on Jun. 21, 2006 and entitled "AN APPARATUS, SYSTEM AND METHOD FOR DEVELOPING TOOLS TO PROCESS NATURAL LANGUAGE TEXT", and International Application Ser. No. PCT/US07/13237, filed on Jun. 5, 2007 and entitled "AN APPARATUS, SYSTEM AND METHOD FOR DEVELOPING TOOLS TO PROCESS NATURAL LANGUAGE TEXT", which applications are hereby incorporated by reference in their entireties.

The present application also relates to U.S. non-provisional patent application Ser. No.11/821,060, filed on Jun. 21, 2007 and entitled "A SATELLITE CLASSIFIER ENSEMBLE," which applications is hereby incorporated by reference in its entirety.

BACKGROUND OF THE INVENTION

1. The Field of the Present Invention

The present invention relates generally to an apparatus, system and method for exploring and organizing document collections. The present invention provides techniques for identifying related terms and for exploring relationships among concepts in a document collection using structured knowledge bases. Concepts may be represented by document meta data, annotations, or linguistic patterns identified in the document collection and structured knowledge bases.

2. General Background

Information extraction (IE) and text mining systems are natural language processing (NLP) systems to identify, normalize, and remove duplicate information elements found in documents. Information extraction systems are used to discover and organize the latent meaningful and fine-grained content elements of documents. These content elements include such entities as persons, places, times, objects, events, and relationships among them. For example, an information extraction task in finance and business might consist of processing business articles and press releases to identify and relate the names of companies, stock ticker symbols, and employees and officers, times, and events such as mergers and acquisitions. These information elements are suitable for storage and retrieval by database and information retrieval systems. In the finance and business example, these data might be used to alert investors, bankers, and brokers of significant business transactions.

Information extraction is related to but distinct from information retrieval (IR). Information retrieval is concerned with searching and retrieving documents or document passages that correspond to a user's query, usually supplied in natural language as a few terms or even a question. Document clustering and classification are related natural language processing (NLP) techniques that can provide other types of high-level document navigation aids to complement IR by organizing documents into meaningfully related groups and sub-groups based on content. Additional related NLP technologies are document summarization, which attempts to find the passages of one or more documents that characterize their content succinctly or generate summaries based on these passages, and question answering, which attempts to find passages in documents or construct answers from documents that represent the answers to questions such as "When was Abraham Lincoln born?" or "Why is the sky blue?"

Information extraction plays a role in IR because it identifies and normalizes information in natural language documents and thereby makes this information searchable. It also brings information retrieval closer to fielded database search because the diversity of expression in text documents has been disciplined through normalization. In the mergers and acquisitions example, the names of companies, persons, products, times, and events would be represented in a uniform manner. This makes it significantly easier to identify business activities for a given company such as IBM even if the original texts had many different ways of mentioning the company (e.g., "IBM", "International Business Machines Corporation", "International Business Machines").

Information extraction systems have traditionally been developed by labor-intensive construction of hand-crafted rules; and more recently by applying machine-learning techniques on the basis of hand-annotated document sets. Both approaches have been expensive, time-consuming, demand significant discipline and quality control, and demand extensive domain knowledge and specialized expertise. Information extraction systems have consequently been difficult and costly to develop, maintain, and customize for specific or different environments or needs. This has therefore limited the audience for information extraction systems.

There are numerous ways an information extraction system needs to be customized or adapted. For example, information extraction systems are typically customized to determine which document structures (such as headings, sections, lists, or tables) or genres (E-mails, letters, or reports) should be treated in a specific manner or ignored. Solutions to this problem, in existing systems, are often fragile and difficult to generalize since they are written for a specific application, domain, site, user, genre, or document structure.

In addition, the linguistic components of information extraction systems (such as lexicons, word tokenization, morphology, and syntactic analysis) must often be customized to deal with the unique language properties of documents in the proposed domains. It is sometimes claimed that generalized linguistic components produce good results irrespective of the domain or genre, but experience does not support this contention. For example, the kind of language found in medical documentation differs significantly from that found in news articles in vocabulary and syntax, among other things. Experience shows that linguistic components tuned to perform well in one of these domains tend are likely to be much less accurate in the other.

Furthermore, it also must be determined which domain- or site-specific information extraction elements and relationships (such as persons, organizations, places, and other entities, times, events, and relationships among them) should be extracted. Experience demonstrates that information extraction for a given entity developed for one domain often does not perform well in other domains. Different domains often demand completely different extraction targets. For instance, a biomedical application may be interested in biochemical and genetic information while a business application may be interested in stock prices.

Lastly, it is necessary to determine how the information extraction elements should be understood and related to each other in an ontology. An ontology organizes and disciplines the development process by defining the extraction categories and their interrelationships, and also provides inferencing capabilities for applications that use the output of an information extraction system. For example, if "diabetes mellitus" is an "endocrine system disorder", it is possible to relate it to "acromegaly" and "hypothyroidism" and vice versa. Ontological relationships make it much easier to normalize, organize, and relate extracted entities; and consequently to search and navigate across them. Furthermore, rich medical ontologies such as SNOMED CT possess inter-connections to many other types of medical knowledge and allow a user to relate "diabetes mellitus" to the "pancreas" (anatomical site) and "insulin" (in two ways: deficient production of this hormone results in diabetes; and insulin injections are used to treat diabetes).

At present, developing, customizing, or adapting information extraction systems demands weeks or months of labor by highly skilled specialists. Substantially shorter times, less expertise, and significantly less effort are necessary for information extraction systems to find a wider audience.

Machine-learning classifiers and classifier ensembles have been used extensively in information extraction. They are highly successful techniques for identifying targets of interest for information extraction such as entities (persons, places, organizations), events, and times; and relationships among them.

It has become more and more common to use large unlabeled document collections and user feedback (for example, using "active learning" and "co-training") to train production classifiers either singly or in combination. However, the resulting classifiers are typically "frozen" or "static" after this initial development. Specifically, these classifiers do not adapt or improve further from user feedback as the information extraction application generates results, and the user modifies or corrects information extraction results.

Furthermore, it is difficult, even for experts, to discern what may be the source of the error in the complex cascade of prior decisions that produced the erroneous result. Further, even if the source of the error can be discerned, it is unlikely that users, as opposed to highly skilled experts, will be able to know how to modify the system or propose which classifier should be adapted with the user feedback.

Finally, users often want to understand how complex systems make decisions. Providing explanations for the results of information extraction applications that rely on a complex cascade of analyses is very difficult even for someone intimately knowledgeable about the workings of the given information extraction application.

Semantic exploration and discovery (SED) refers to a range of unsupervised and supervised methods for identifying salient latent semantic patterning in document collections. SED results play two important roles in information extraction: to assist in understanding and organizing the content of document collections; and to reveal the latent semantic categories that might play a role in designing an information extraction system.

Developers of information extraction systems are not always fully aware of the nature of the documents to be analyzed nor about the information extraction targets to be sought. SED lets "the data speak for itself" to the developers. A developer typically starts the development of an information extraction application with a rough notion of informed extraction targets and how they manifest themselves in natural language. An analysis of a document set might reveal that it contains additional information extraction targets that could be helpful to the application's users. For example, a collection of astronomical papers may include the names and characteristics of astronomical instruments that complement stellar spectrum data. Furthermore, the proposed information extraction targets may manifest themselves in natural language quite differently or unexpectedly in a document set. This may suggest modifications to the definitions of the information extraction targets and how and where they are to be extracted. SED therefore can play a significant role in the development of information extraction systems.

First, SED can be used to create an initial pool of relevant examples for the IE system by identifying information extraction targets that users will find valuable to identify regularly in new documents.

Second, SED can be used to identify supporting contexts that can improve the performance of an IE system. Some words, phrases, text patterns, and other linguistic contexts may not be significant as information extraction targets per se, but they may be helpful to the information extraction process itself. For example, an information extraction system may not be directly interested in place names, but lists of place names may indirectly provide reliable contexts for extraction patterns for other information extraction targets, such as the names of hospitals and government buildings. Similarly, if in a medical information extraction application it is observed that current medications are reliably dictated in a limited number of document sections, for instance, the medications and plan sections, then identifying these sections can markedly improve the accuracy of medications extractions.

Finally, SED can be used to set negative examples where some categories may be valuable precisely because they should be excluded as categories for extraction targets (that is, they are "negative" evidence). In other words, the accuracy of an IE application can be improved by reliably excluding text content that the information extraction target cannot be. For example, by reliably identifying Social Security and telephone numbers, an information extraction application reduces the size of the pool of hyphenated numbers such as year ranges and IDs and ensures that they are not misidentified as Social Security and telephone numbers.

SED methods can also take advantage of structured knowledge sources such as ontologies, taxonomies, and thesauri. SED methods provide two ways for developers and users to gain semantic insight into documents targeted for information extraction: lightweight and heavyweight. Lightweight SED methods perform fast semantic analyses of document collections by eschewing complex linguistic and statistical pre-processing. Heavyweight SED produces richer and generally more reliable semantic analyses of document collections, but at the expense of complex linguistic and statistical pre-processing.

2. Deficiencies of the Prior Art

When developing a natural language processing (NLP) application, it is essential to understand how the document collection is organized by format and content, what concepts are found in the document collection, how they are expressed, and how these concepts relate to each other.

A developer must use only documents that are relevant to the particular application for development and evaluation. For example, the developer of a financial reporting NLP application should use only financial and business articles from a newspaper or journal document collection. To do this, the developer needs accurate and efficient techniques for clustering and categorizing documents by topic, task-specific graphical user interfaces to display clustering and categorization information, and additional techniques to improve categorization and clustering through user review and feedback.

A developer must understand what concepts are found in these documents. As a rule, information extraction application development begins speculatively about what concepts are found in the target document collection and how they are expressed there. What is really found in the document collection, however, is an empirical issue. For this, the developer needs to explore the document collection, identify important semantic categories, understand the ways in which these semantic categories are expressed, and, if appropriate, create lists of terms semantically relevant to the information extraction targets. For example, a developer may want to start his investigation of a document collection by collecting information about the desired information extraction targets. One common approach to this is to identify a set of documents that are retrieved by a query, and display those terms that are most strongly associated with that query in context. A developer may want to find terms in the document collection that are most strongly associated with a given cluster of documents. A developer may want to quickly reveal the many ways a particular concept is expressed. These tasks would be prohibitively time-consuming if they required the developer to read and review documents manually. Using a standard information retrieval tool provides very little improvement in productivity since the developer must still review each document. To perform this task efficiently, the developer needs accurate techniques for identifying semantically related terms and documents, task-specific graphical user interfaces to display these semantically related terms and documents, and additional techniques to improve accuracy of identifying semantically related terms and documents through user review and feedback.

A developer sometimes must organize the documents and the concepts found in the document collection according to a structured knowledge base. These may be highly structured knowledge bases, such as an ontology, taxonomy, or thesaurus, or only partially structured, such as a dictionary or topic-specific reference works or manuals. For example, medical discharge reports are often coded for billing purposes using complex medical administrative coding systems such as ICD-9-CM and CPT-4. To accomplish this task the developer needs accurate and efficient techniques for relating concepts found in documents to concepts found in knowledge bases, task-specific graphical user interfaces to display this information, and additional techniques to improve accuracy of this information through user review and feedback.

Reference works such as dictionaries, taxonomies, thesauruses, and technical reference works and manuals and textbooks are partially structured knowledge bases and they may be used to create searchable knowledge bases. These applications may be used directly as searchable standalone reference works with extensive semantic query and navigation capabilities or as an adjunct to information retrieval to improve the quality of queries. Both of these applications provide a partial solution to one of the fundamental problems facing information extraction and semantic search: how to create a rich structured knowledge base (ontology) for a given field of interest efficiently.

There are many well-understood and widely used natural language processing techniques for searching, categorizing, clustering, and summarizing document collections. More recently, techniques have been developed for searching document collections semantically, from the point of view of a structured knowledge base such as an ontology, taxonomy or thesaurus. These recent techniques improve information retrieval by enhancing queries with additional semantically relevant terms. This functionality is valuable for document retrieval.

However, searching, categorizing, clustering, finding related concepts, and other semantic navigation and organizational methods have one unavoidable problem: how to search, organize or navigate a document collection when it is not clear what information is actually in the collection. This problem is found in search, when a user attempts to determine which terms should be used to construct a query for a given concept; in categorization, when a developer attempts to determine which categories of information appear in the document collection and organize the documents into coherent groupings; and in document clustering, when a developer attempts to determine which document are strongly associated with each other and how these associations are related to the semantic content and structure of these documents. Furthermore, these tasks are not independent of a user's information needs. For instance, an identical collection of business articles may be categorized entirely differently by an economist looking for economic trends than by a sociologist looking for data about consumer behavior.

Most proposed solutions to these problems have proven unsatisfactory. Predetermined or fixed sets of categories are often unrelated to or unaligned with a user's information needs. Unsupervised methods such as document clustering produce results that more often than not do not align with a user's intuitions or information needs. Document categorization requires representative sets of already categorized documents, but simply shifts the question to how the initial document categorization was done and whether or not it aligns with the user's needs. It is not surprising, then, that developing domain- or application-specific knowledge bases has proved very complex and expensive.

Finally, independent techniques exist for performing these tasks, but they are typically done in isolation. None of the prior art combines these into a single application development environment, provides task-specific graphical interfaces and techniques to improve accuracy through user review and feedback, and uses a uniform representation underlying all of these techniques.

SUMMARY OF THE INVENTION

We have discovered a system and method for enabling a developer or user to reveal, navigate, and organize semantic patterns and structures in a document collection with or without the aid of structured knowledge bases. The semantic discovery and exploration system provides techniques for searching document collections, categorizing documents, inducing lists of related concepts, and identifying clusters of related terms and documents.

In a first aspect, the present invention includes a method for exploring and organizing a first electronic corpus of documents stored in a computer storage medium, the method including performing at least one of reviewing the text of the documents from the first electronic corpus of documents in a concordance form, collecting terms from the first electronic corpus of documents in order to build semantically related terms, or collecting documents from the first electronic corpus of documents in order to build semantically related documents clusters.

The method also includes creating a first set, where the first set includes at least one category applying to at least one of the words and phrases in gazetteers, or at least one document in the semantically related document clusters and creating a second set, where the second set includes at least one of a candidate document cluster or a candidate words and phrases list The method also includes evaluating the second set based upon a set of predetermined factors in order to create a third set, where the third set includes at least one document semantically related to the candidate clusters or at least one semantically related word and phrase related to the candidate words and phrases that meet at least one of the predetermined factors and selectively substituting the third set for the first set in a subsequent iteration of the method for exploring.

In some embodiments, the predetermined factors include a stopping condition. In some embodiments the method includes using preexisting lists of terminology. The method may also include annotating words and phrases for membership in a predetermined set of categories in a predetermined number of training documents. The method may also include clustering documents for membership in a predetermined set of categories in a predetermined number of training documents and where the performing step is performed in at least one of an unsupervised mode or a semi-supervised mode.

In some embodiments the method includes identifying a first set of words and phrases in a second corpus of documents and identifying a first set of document clusters in a second corpus of documents. The method may also include identifying contexts in which the first set of words and phrases occur and formatting the contexts so that substantially similar candidate contexts are identified in the second corpus.

In some embodiments the method includes using the formatted contexts and proposing additional candidate terms with their respective proposed category assignments, based on associations between known contexts, the candidate contexts generated relative thereto, and the terms from the first corpus. The method may also include identifying attributes of the first set of document clusters and formatting the contexts so that substantially similar candidate contexts are identified in the second corpus. The method may also include the identification of document attributes so that substantially similar candidate document attributes are identified in the second corpus.

In some embodiments the method includes using the formatted contexts and proposing additional candidate documents with their respective proposed category assignments, based on associations between known contexts, the candidate contexts generated relative thereto, and the terms from the first corpus. The method may also include using the document attributes and proposed additional candidate documents and proposed respective document cluster assignments, based on associations between known document attributes, the candidate attributes generated relative thereto, and the documents from the first corpus. The method may also include organizing the concepts into at least one of a semantic thesaurus and an ontology and using words, phrases, or annotations of the documents to provide examples for review in a concordance graphical user interface. The method may also include using a structured knowledge source. The method may also include using a query graphical user interface.

In a second aspect, the present invention includes a computer system for exploring and organizing an electronic corpus of documents stored in a computer storage medium, where the computer system includes an exploration resource module for managing the semantic exploration process, an exploration engine in communication with the exploration resource module and a document management module in communication with the exploration resource module, where the document management module for feeding document sets into the exploration resource module. The invention according to this embodiment may also include an ontology management module in communication with the exploration resource module, where the ontology management module feeds and receives sets of ontologies to and from the exploration resource module, a resource definitions database in communication with the exploration resource module, where the resource definitions database feeds and receives sets of definitions into and from the exploration resource module and a query manager module in communication with the exploration engine, where the query manager module has access to a query definitions database and a query results database and the query manager module feeds and receives query information to and from the exploration engine. The invention according to this embodiment may also include an exploration interface in communication with the exploration engine, where the exploration interface displays information related to the semantic exploration process.

In some embodiments the computer system may also include a set of predetermined ontologies, where the set of ontologies are directed into the exploration resource module via the ontology management module. In still other embodiments the computer system may also include at least one annotation interface where the annotation interface is in communication with the exploration resource module.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the figures, wherein:

DETAILED DESCRIPTION OF THE PREFERRED EMBODIMENTS

Figure 1:
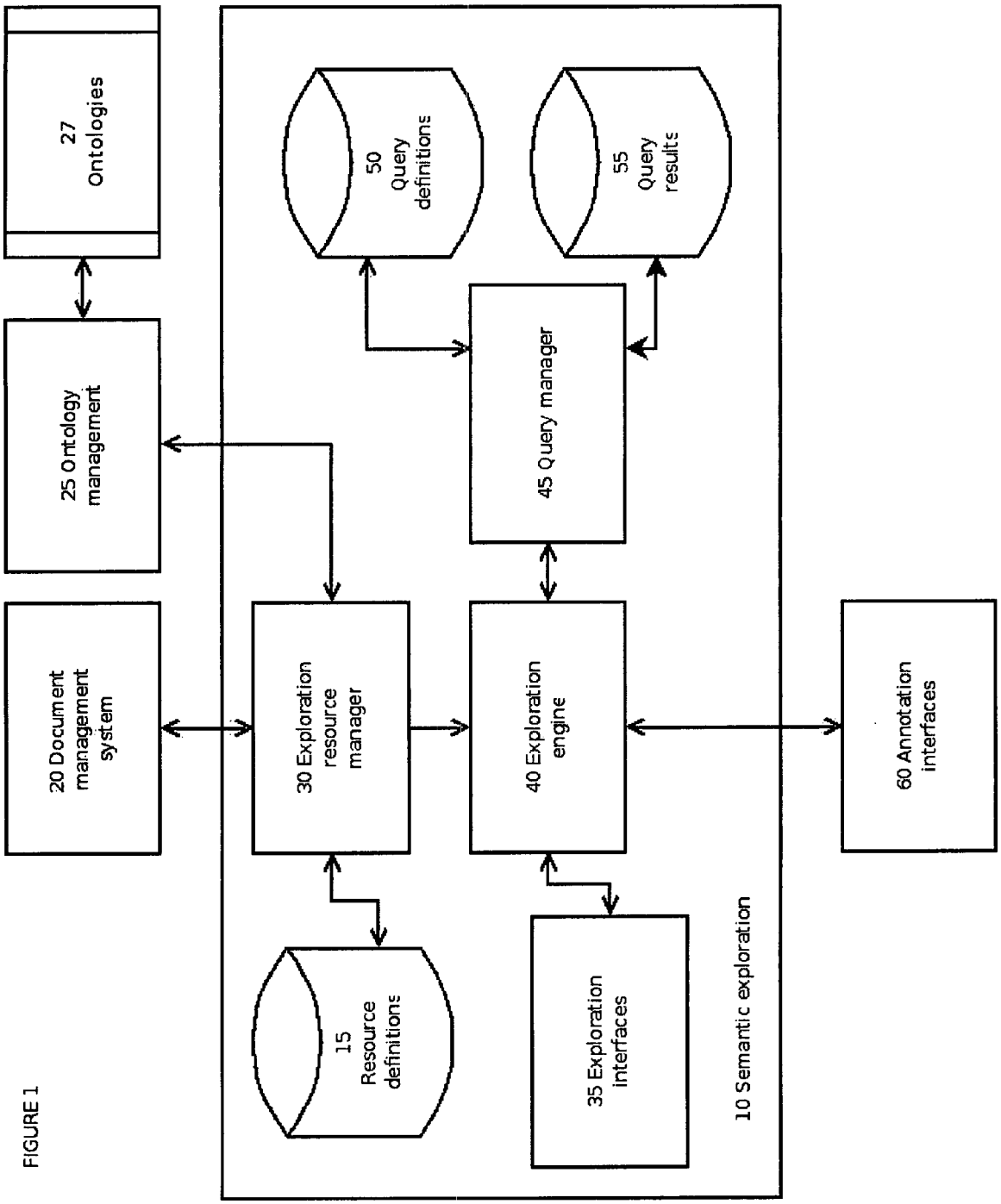
FIG. 1 shows principal components of a semantic exploration and discovery environment and their interrelationships according to one embodiment of the present invention.

The present disclosure will now be described more fully with reference to the Figures in which an embodiment of the present disclosure is shown. The subject matter of this disclosure may, however, be embodied in many different forms and should not be construed as being limited to the embodiments set forth herein.

The semantic discovery and exploration (SED) system according to the present invention provides a suite of closely allied computational techniques that require minimal user input and data organization to perform search, navigation, categorization, clustering and identifying related terms. These techniques can directly exploit structured knowledge bases, if they are available.

These techniques also exploit semi-structured knowledge sources such as dictionaries, encyclopedias, manuals, and other reference works that provide some semantic structure. For example, an encyclopedia is organized by entry. Each entry has a name (its "headword") and sometimes synonyms (variant headwords). The entry itself consists of words and phrases, sentences, paragraphs, and sections. Sections may have headings. The entry often contains "See also" cross-references ("hyperlinks") to other entries. There is normally a text fragment in the entry highlighted by each cross-reference. The entry may have one or one topic categories supplied by the encyclopedia editorial staff. The entry may also include a bibliography with lists of authors and titles. Each of these types of information is a form of semi-structured knowledge that relates one encyclopedia entry (a concept) to another entry (another concept). These links are converted into named relations (for example, "synonym of" for headword variants or "related to" for cross-references) that become the raw material for a web of semantic relations among the entries themselves. To this web are added the terms and phrases and any other annotations and semantic information from the text of the entries themselves. The semantic discovery and exploration system supplies computational techniques for combining the terms and phrases and other annotations of a document collection and reference works and semi-structured reference works or structured knowledge bases to search, navigate, categorize, cluster and identify related terms.

The semantic discovery and exploration system also provides a bootstrapping method for finding lists of semantically related terms starting from a small list of user-provided "seed" terms. These lists help the developer and user in several ways. First, they create a topically coherent list of terms, or a gazetteer, for target concepts.

As the term is used in IE, a "gazetteer" is a focused topically specific term (word and phrase) list. Gazetteers may be generic or limited to a given individual or group. Information extraction applications have gazetteers for geopolitical entities such as countries, political organizations, states and provinces, cities, geographical entities such as rivers, lakes, mountains, oceans, business and financial entities such as corporations and governmental entities such as regulatory agencies and departments. In a medical application, there may be gazetteers for medications, disorders, procedures, physicians and nurse surnames, hospitals, clinics, and department names.

Gazetteers can be extremely effective at identifying concept in documents. Second, these lists show how the prevalence and diversity of user-defined concepts in a document collection. Third, the lists provide a pool from which synonyms and other variants of terms can be drawn. For example, call reports may represent the concept customer in many ways: "customer" "caller" "cust" and so forth. This bootstrapping method identifies most of these variants automatically.

Both developers and users benefit from the semantic discovery and exploration system. Developers benefit by being able to understand how document collections are organized semantically and what task-specific information is latent with the document collection.

Users benefit by being able to search, navigate, and organize task-specific information in document collections with greater intelligence and precision. Semi-structured or structured knowledge sources may be added to the system to improve performance for both developers and users.

A method of SED according to one embodiment of the present invention implements a lightweight semantic exploration and discovery or "LSED". LSED implemented to perform unsupervised document clustering employs two complementary clustering approaches. First, document clustering by content discerns patterns in the content based on the words, phrases and other annotations found in the documents, and groups documents accordingly. This form of clustering provides insight into the topics presented in the document collection. Dividing a document collection into clusters is sometimes very important for information extraction tasks. It may be appropriate in some cases to treat a document collection as a combination of distinct sub-collections, each of which is analyzed and processed separately. For example, a collection of newspaper articles contains articles on sports, medicine, local politics, international events, and so forth. An information extraction task focusing on sports should, under most circumstances, be performed on the sports sub-collection of newspaper articles.

Second, document clustering by structure discerns patterns on the basis of the headings and labels of the documents and ignoring the contents of documents. This form of clustering provides insight into the organization of the documents in the document collection. This perspective is sometimes coincident with topic clustering (i.e., where different document structures are used with different content), and sometimes independent of topic (i.e., where the same document structures are used with different content). For example, police accident reports will have an entirely different structure and organization than medical discharge summaries. These differences may be used advantageously to improve the performance of an information extraction system.

LSED may also be implemented on the basis of co-occurrence patterns of words, phrases and other annotations. LSED in general may employ statistical measures to identify words, phrases and other annotations that co-occur in similar contexts. This approach has proved very effective when applied to large document collections. Term normalization (such as low-level semantic annotation to identify such entities as dates, telephone numbers, ZIP codes, and Social Security Numbers; stemming or baseforming; and part-of-speech disambiguation) is often employed to get the most out of co-occurrence data for collections of all sizes. Co-occurrence clustering can be used to identify potential extraction targets and to generate domain-specific semantic lexicons and gazetteers.

LSED implementations may also include ontology-, taxonomy- and thesaurus-based term matching where the LSED employs techniques that provide semantically and statistically motivated matches between the terms in an ontology, taxonomy or thesaurus and the expressions found in a document collection. These matches exploit the semantic relationships represented in the ontology, taxonomy or thesaurus (often restricted to synonymy and closely related terms) as well as the relative significance of the terms as keywords in the document collection. This form of matching can reveal many key concepts incorporated in preexisting knowledge bases and can thereby suggest the varieties of and relationships among the concepts found in the document collection. This form of matching can also be used to generate document keywords.

The method of SED according to one embodiment of the present invention may also implement heavyweight semantic exploration and discovery or "HSED". HSED employs word-, phrase- and annotation-based semantic clustering based on co-occurrence patterns with complex linguistic pre-processing where the SED employs statistical measures to identify words, phrases and other annotations that co-occur in similar linguistic contexts. These contexts are defined by pre-processing the text to identify linguistic contexts such as noun, prepositional, adverbial, adjectival and verb phrases and other significant syntactic relations among phrases such as apposition, subject-verb, verb-object relations. This approach has proved effective when applied to large document collections. Term normalization (such as low-level semantic annotation to identify such entities as dates, telephone numbers, ZIP codes, and Social Security Numbers; stemming or baseforming; and part-of-speech disambiguation) is employed to gain maximal advantage from document collections of all sizes. Co-occurrence clustering can be used to identify potential information extraction targets and to generate domain-specific semantic lexicons and gazetteers.

HSED generally produces results with higher precision (that is, more of the results are correct), but lower recall (that is, fewer results are proposed) than LSED.

HSED may accomplish extractions based on syntactic pattern where SED employs syntactic "case frames" or patterns of phrases in syntactic relationships to each other such as subject-verb, verb-object, and subject-predicate-adjective, to identify semantically significant expressions in the document collection. Terms found by case frames are also labeled using the semantic categories derived using the word-, phrase- and annotation-based semantic clustering approach described immediately above. The syntactic case-frame approach provides users with a different perspective on the contents of a document collection based on the relationships among the noun phrases of a document collection as characterized by the actions that link them. The case-frame approach complements word-, phrase- and annotation-based semantic clustering. Since case frames are typically verb-centric, they dispense with relationships among nouns and adjectives and their prepositional modifiers, and verbs and their adverbial modifiers. Semantic clustering based on syntactic pattern, on the other hand, takes into account additional productive linguistic processes such as adjectivization, adverbialization, and nominalization.

The present invention includes two main methods provided for semantic exploration and discovery. The first is primarily used for collecting terminology to build lists of terminology ("gazetteers") and to collect concepts to be developed and organized into semantic thesauruses, taxonomies and ontologies, and to generate training and evaluation data for the development of tools to extract these concepts. This tool operates in both unsupervised and semi-supervised modes.

This tool begins from small list of terms. These terms may be drawn from preexisting lists such as gazetteers or lists developed for other information extraction tasks. They may also be small "seed" lists of terms developed by reviewing a small number of documents. From these data, the developer constructs one or more lists of terminology in the desired categories.

In an unsupervised process, the system identifies automatically and without review sets of examples of words and phrases in a larger corpus of documents. These words and phrases are semantically related to the starting or "seed" terms by virtue of the contexts in which these terms occur.

The present invention relies on lightweight syntactic analysis (e.g., part-of-speech disambiguation and phrase identification) to control the manner in which example contexts are collected.

The present invention also relies on the indexing features of the development environment to efficiently perform the computation required for this analysis and having collected example contexts that are transformed in various ways so that lists of similar but not identical candidate contexts can be identified in the corpus.

The present invention uses the transformed contexts to propose additional candidate terms and proposed category assignments for them, based on associations between known contexts, the candidate contexts generated from them, and the known terms in the expanding candidate terms lists.

This present invention can be enhanced by developer review and feedback, which can take the form of correcting the category assignments of new terms proposed by the system, by assigning incorrect terms to correct categories, by correcting the scope of generated candidate contexts, and by adding missing terms and their categories to refine the candidate terms lists.

The workflow, with or without supervision, can be repeated in a series of cycles. The size of the document collection may be increased as the extraction process progresses.

The second method for semantic exploration according to one embodiment of the present invention exploits relationships identified in a document collection. Minimally, this method uses the co-occurrence relationships among words, phrases and annotations ("terms") and documents in a corpus (the documents they occur in, and the terms they co-occur with).

In addition, when available, the set of relationships used for this method of semantic exploration can be augmented by structured knowledge bases. The terms of the documents are linked to the (possibly hierarchical) set of topical categories and the contents of one or more semantic thesauruses, taxonomies or ontologies, containing concept-to-concept and term-to-concept relationships where relationships are classified by type (such as synonomy, hyponomy/hypernomy, and so forth).

The present invention employs graphical user interfaces, some of which are variations on annotation interfaces and some of which are purpose-built, for semantic exploration tasks.

The basic functionality provided by this form of semantic exploration falls into two broad categories: query by example; and classification and categorization.

In query by example, the developer selects a set of nodes of interest out of the entire network of nodes and relationships. Selected nodes might include terms found in documents, prior document annotations, prior document categories, entire documents or parts of them, concepts in an ontology, or a combination of these. The user may designate input nodes as "positive" (that is, they are nodes for which associations should be enhanced) or "negative" (that is, they are nodes for which associates should be diminished). The user may also designate the relationships in the semantic network that are allowed to be traversed; and the depth to which the network may be traversed from the starting nodes.

The system uses the input nodes, and the computed network of relationships, to find other nodes in the network that are most strongly associated with the query nodes.

This mode of exploration can be used for gazetteer development, ontology development, alignment of structured knowledge bases, development of document categorization, and general exploration of the semantic content of a document collection. It supports a wide variety of development tasks because the method is flexible with regard to the data that can be represented in the network of nodes and relationships, and because it computes strength of association across many different types of nodes.

Document categorization is performed as a semi-supervised learning task. The developer first configures the categorization process, by setting, for example, the number of documents to be reviewed in each query cycle and the size of the target document pool. The developer starts with a "seed" query consisting of some initial terms, annotations or documents. This query produces a set of documents from which a small subset is selected for manual review. The developer reviews the query results for relevance to the proposed category. The set of validated documents is then added to the pool of categorized documents. This set is in turn used as a query against the remaining documents and reviewed for relevance. These steps are repeated for this category until the document pool is deemed sufficiently large. This process is repeated for each desired category. The resulting document category pool may then be used to classify any remaining documents in the document collection or entirely new documents.

Classification exploits the same underlying method, by taking an unknown node or set of nodes, (e.g., a document) and computing its strength of association with a sets of nodes in known categories (e.g., a set of pre-categorized documents). The strongest associations indicate the category, or categories, mostly likely to represent the unknown nodes. Classification may be configured to select only a limited number of categories. This approach to categorization permits a document to belong to more than one category.

Some IE applications use extraction techniques based exclusively on syntactic patterns such as subject-verb, verb-object, and subject-predicate-adjective or phrasal patterns such as "X like Y" or "X such as Y" are used to identify semantically significant expressions and relations between concepts in the document collection. These syntactic pattern and phrasal approaches provide users with an additional perspective on the contents of a document collection, for example, relationships among the noun phrases of a document collection characterized by the actions that link them. The syntactic and phrasal pattern approaches complement word, phrase and annotation-based semantic exploration. The default word, phrase and annotation-based semantic exploration process identifies more relationships among words of arbitrary syntactic function (i.e., not just noun phrases, but also adjectives and their prepositional modifiers, verbs and their adverbial modifiers and so forth) that are not identified by a syntactic pattern approach based on noun phrases and verb groups alone. As noted earlier, semantic extraction using syntactic patterns usually produce results with higher precision, but lower recall than semantic extraction using words, phrases and annotations. If a document collection has been annotated for syntactic and phrasal patterns, this information may be incorporated into the semantic exploration and discovery system.

Natural language documents possess varying degrees of structure. At one extreme are unstructured documents, texts with no display or font information and at most minimal structure such as paragraphs and sentences. Semi-structured documents have identifiable document structure elements such as titles, headings, lists, and tables. Similarly, letters and E-mails may have sender and addressee addresses, dates, subject lines, salutations, and attachment and routing designations. These structures are not always present, are frequently inconsistent and may differ dramatically from domain to domain and genre to genre. For example, medical discharge summaries have different content and organization than police accident reports. At the other extreme lie structured documents, characterized by a well-defined markup language and structure specifications such as SGML or XML.

The content of natural language documents is typically not presented in a structured way. Natural language documents such as letters and E-mails often contain content such as names, organizations, places, times, events, and relationships among them. However, except in the rarest of cases, this information is found within the normal flow of text narrative in an unstructured or at best semi-structured way. For example, an E-mail might indicate the name of the addressee in a structured way its formal header as well as in the salutation in the body of the E-mail itself.

Ultimately, the goals of exploration, information extraction, and text mining of texts is to discover and normalize the structure of documents; and to discover, organize, normalize, and identify the duplicate information elements, its content, found within documents.

Referring now to the figures, FIG. 1 shows the principal components of the semantic exploration environment 10 and their interrelationships according to one embodiment of the present invention. The semantic exploration environment 10 is controlled by the exploration engine 40. Users interact with the exploration engine using the exploration graphical user interfaces 35 with the exploration resource manager 30.

The set of resources used by the exploration engine 40 are specified and managed by the exploration resource manager 30. The exploration resource manager 30 has a repository for resource definitions 15. The documents used by the exploration engine 40 are managed by the document management system 20. The ontologies 27 used by the exploration engine 40 are managed by the ontology management system 25.

User queries submitted to the exploration engine 40 are managed by the query manager 45 which has a repository for storing query definitions 50 and a repository for storing query results 55.

The semantic exploration engine 10 is used to categorize documents and construct lists of semantically related terms. The user reviews and provides feedback for these processes using the annotation graphical user interfaces 60.

Figure 2:
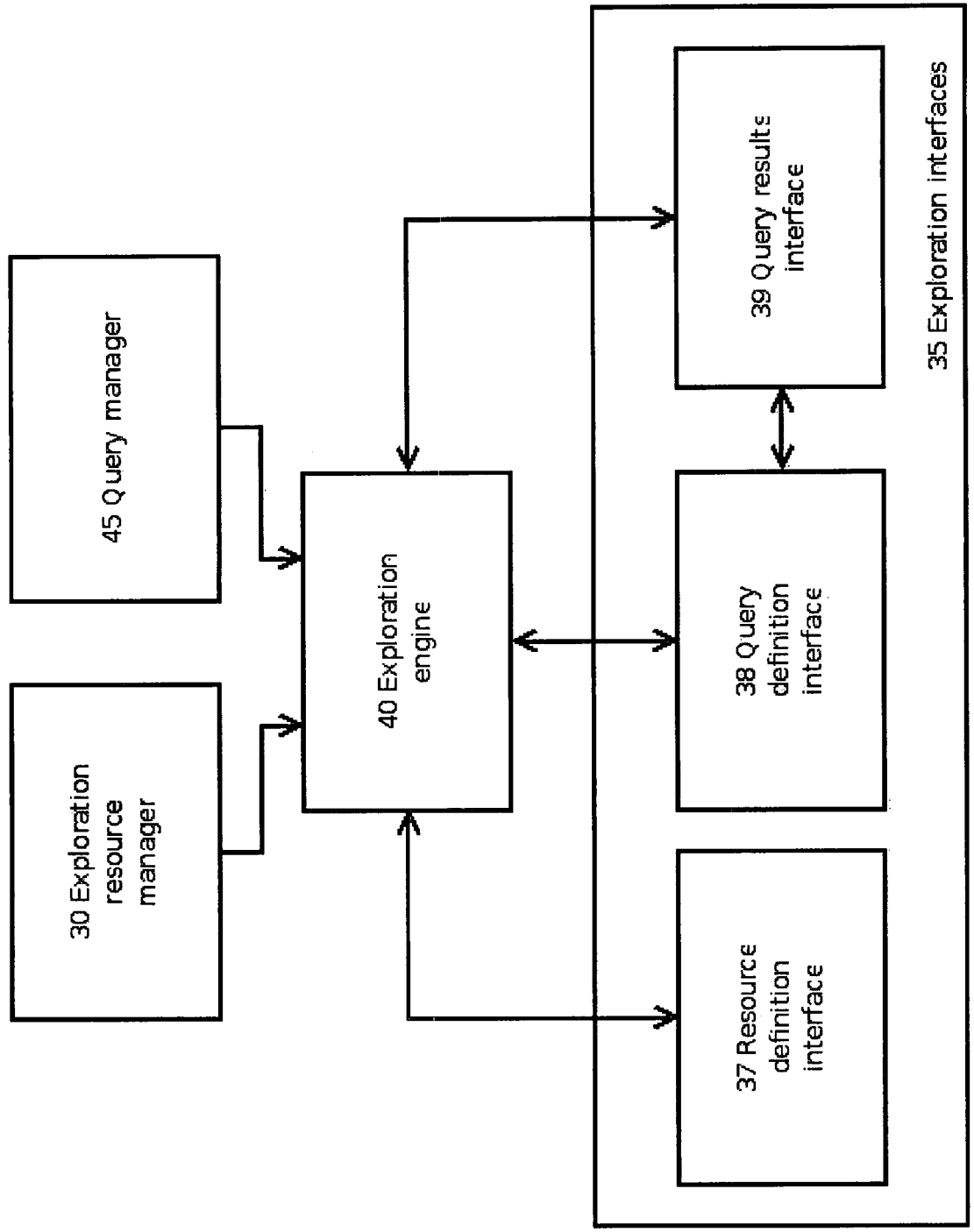
FIG. 2 shows the graphical user interfaces used for semantic exploration.

Referring now to FIG. 2 there is shown graphical user interfaces used for semantic exploration 35. The exploration graphical interfaces 35 consist of three graphical user interfaces: a resource definition graphical user interface 37 for managing resource definitions; a query definition graphical user interface 38 for managing queries; and a query results graphical user interface 39 for viewing and managing query results.

Figure 3:
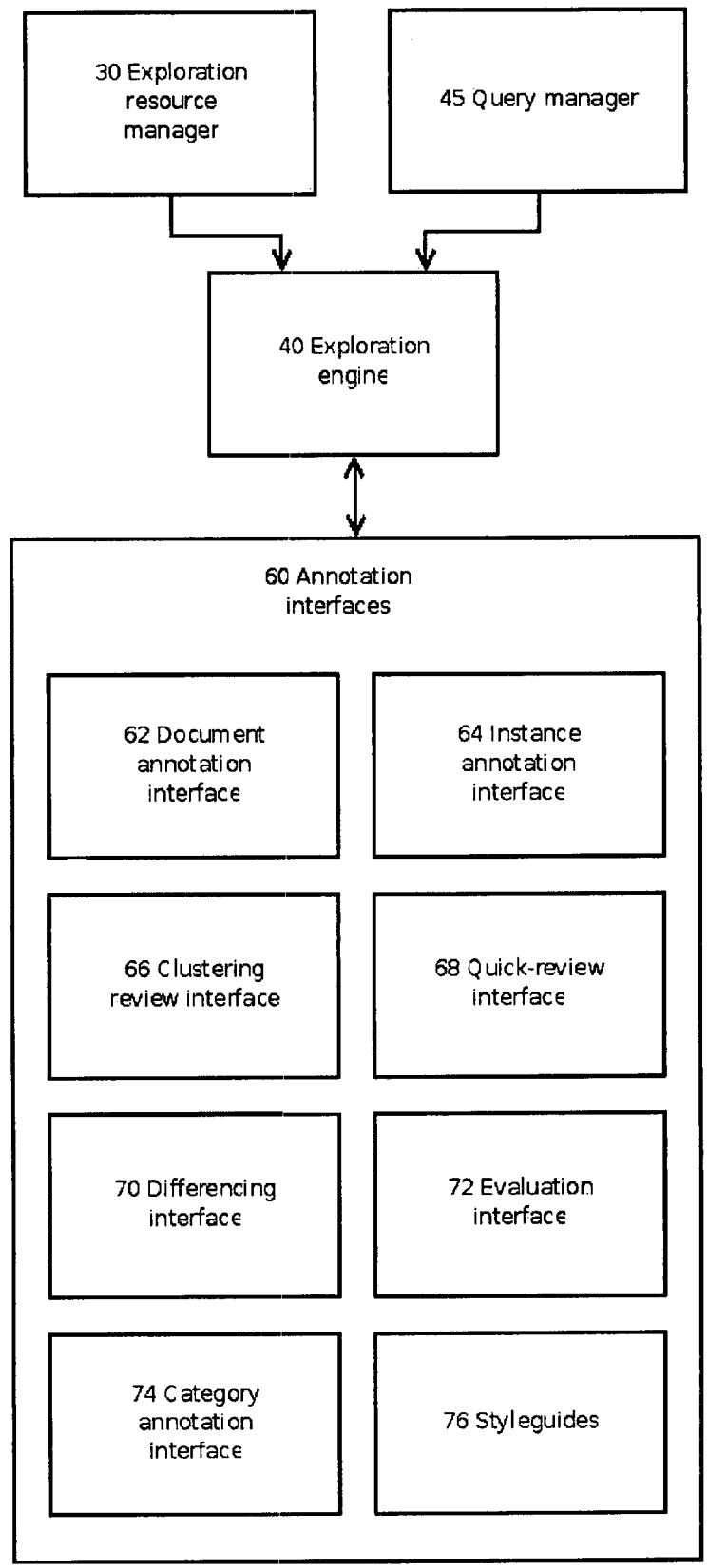
FIG. 3 shows the graphical user interfaces used for annotation.

Referring now to FIG. 3 there is shown graphical user interfaces for annotation 60. The annotation graphical interfaces 60 consist of eight graphical user interfaces for reviewing, modifying, creating, and deleting annotations. The document graphical user interface 62 is employed for making manual annotations on individual documents. A clustering review graphical user interface 66 is employed for annotating the contents of document clusters. A differencing graphical user interface 70 is employed for the comparison of the annotations of one annotated data set with those of another. A category annotation graphical user interface 74 is employed for annotating the lists of categories generated by processes such as document clustering and document structure recognition. An instance annotation graphical user interface 64 is employed for annotating text data in documents represented as a concordance of instances. A quick review graphical user interface 68 is employed to rapidly display instances in document context. An evaluation graphical user interface 72 is employed to display statistics that summarize the degree of agreement of one annotated data set with itself or another data set. Finally, a style guides graphical user interface 76 is employed to view and edit the contents of the style guides associated with a given document collection.

Figure 4:
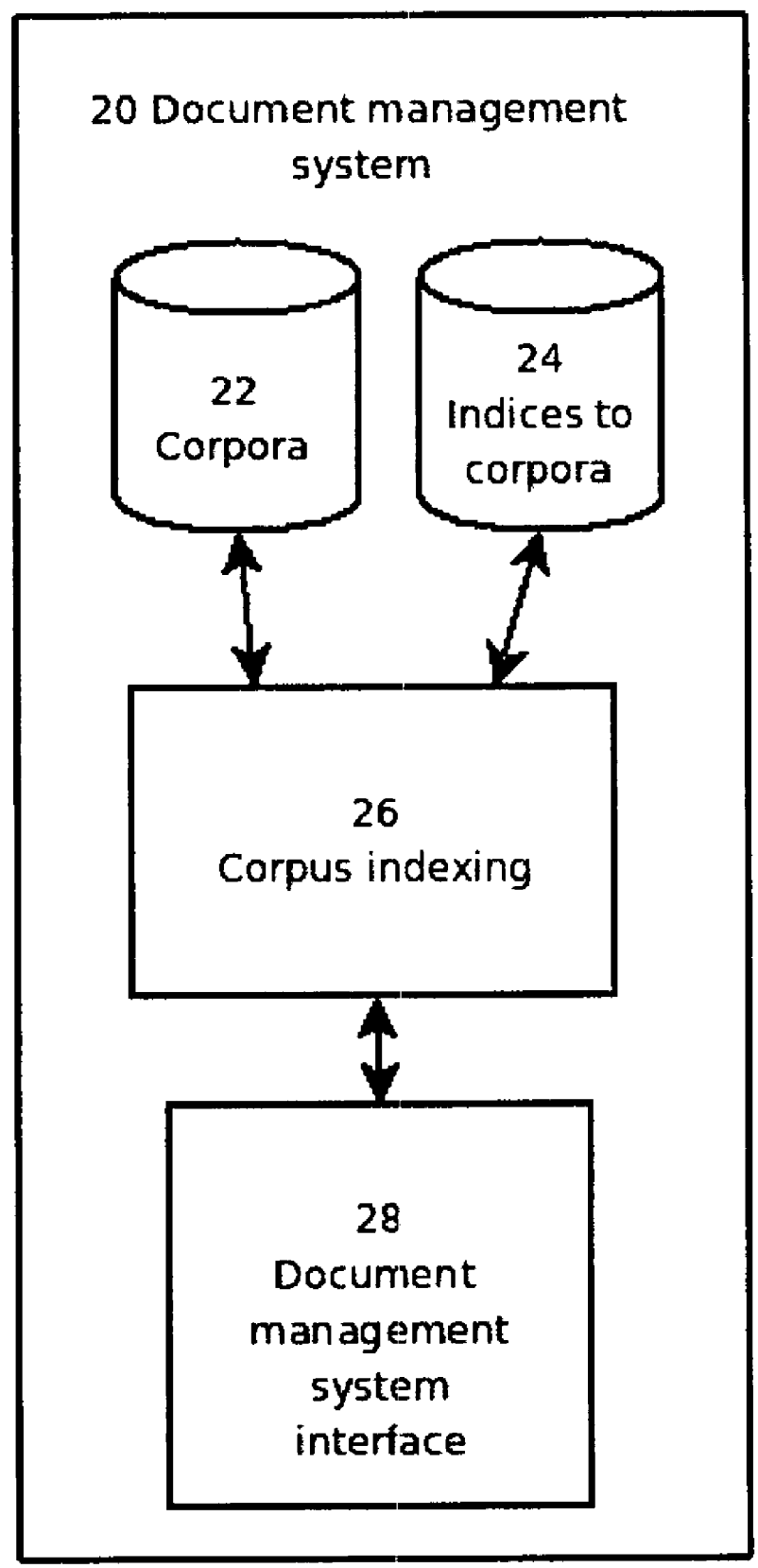
FIG. 4 shows components of a document management system according to one embodiment of the present invention.

Referring now to FIG. 4 there is shown the components of the document management system 20. The document management system 20 consists of a document management system application interface 28 that allows users to perform information extraction tasks on collections of text documents. It is necessary to perform corpus indexing 26 on each constituent document collection ("corpus") that is stored by the document management system 20. Corpus indexing 26 refers to the process of identifying the indexable units of a corpus, typically tokens, words, and other linguistically relevant annotations, and storing location and other information about these indexable units. The original text data is stored in a corpora repository 22. A repository containing indices to the corpora 24 stores the locations and other information about these indexable units.

Figure 5:
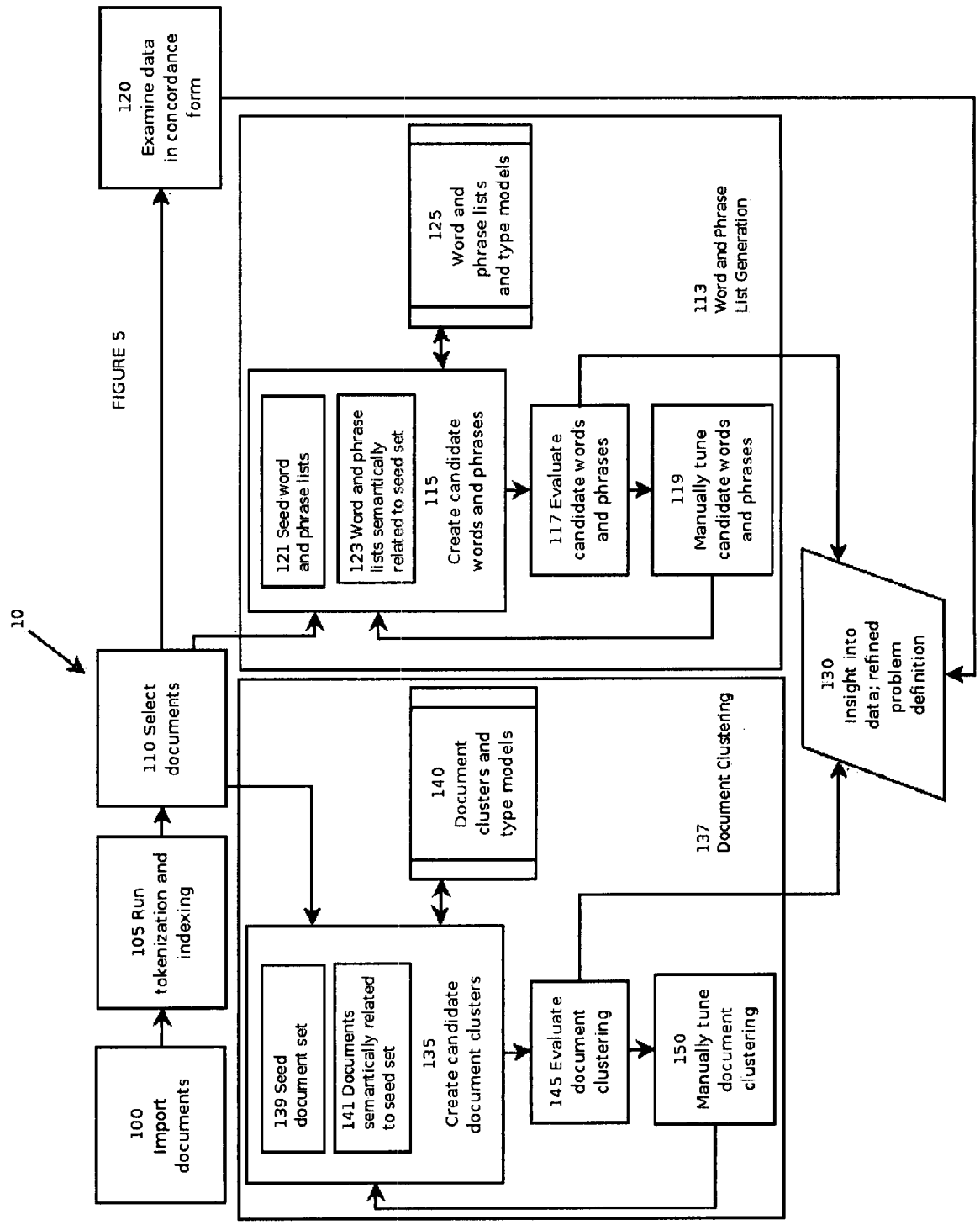
FIG. 5 shows a representative workflow for performing semantic exploration on a document collection according to one embodiment of the present invention

Referring now to FIG. 5 there is shown a representative workflow for performing semantic exploration 10 on a document collection. To perform semantic exploration 10 the user first imports a set of documents 100 into the semantic exploration environment 10. The documents are then tokenized and indexed 105. Depending on the size of the document collection and the user's specific needs, the user may choose to select a sample collection of documents 110 of the original set of imported documents 100.

The user then may perform three tasks including examination of the document collection data in concordance form 120, word and phrase lists generation 113 to create words and phrases lists and type models 125, and document clustering 137 to create document clusters and type models 140.

Referring to element 137 for document clustering, steps may be performed to create to document clusters and type models 140. The user creates candidate document clusters 135 by providing a set of seed documents 139 that represent the topics of interest. Next document clustering generates a set of documents that are semantically related to these seed documents 141. These semantically related documents (or more commonly only a small subset of them) are then reviewed 145 for relevance whereby the user may choose to change the contents of document clusters by manually tuning the document clustering 150. Manual tuning involves such processes as changing the cluster to which a given document belongs, adding a document to one or more clusters, removing a document from one or more clusters, dividing the documents in a cluster into two or more sub-clusters and combining the documents in one or more clusters into a single cluster. The system then generates another set of documents 141 semantically related to the tuned seed set 139, and tuning 150 is repeated to create a more and more accurate and larger collection of document clusters. After each round of candidate document cluster generation, the document clustering is evaluated 145 against a stopping criterion. If the stopping criterion is satisfied (for example, a sufficiently large number of documents has been analyzed or enough documents of each document type have been collected), the cycle of generation and tuning stops.

Referring to element 113, steps may be performed to create word and phrase lists and type models 125. The semantic exploration system 10 automatically generates a list of candidate words and phrases in gazetteers for each of these categories 115. A user may create candidate words and phrases (or gazetteers) 115 by providing a set of seed terms for each category of words and phrases 121. Next the system 10 generates a set of words and phrases that are semantically related to the seed set of words and phrases 123. The word and phrase lists (more commonly only a small subset of them) are then reviewed for relevance whereby the user may choose to change the contents of these lists by manually tuning the candidate word and phrase lists 119. Manual tuning 119 involves such processes as changing the list to which a given word or phrase belongs, adding a word or phrase to one or more lists, removing a word or phrase from one or more lists, dividing the words and phrases in a list into two or more sub-clusters; combining the word and phrases in one or more lists into a single list; and so forth. The cycle of generation and tuning 119 is repeated to create a more and more accurate and larger set of lists. After each round of candidate word and phrase list generation, the generated lists are evaluated 117 against a stopping criterion. If the stopping criterion is satisfied (for example, a sufficiently large number of words and phrases has been analyzed or enough words and phrases of each category have been collected), the tuning process stops.

The resulting document clusters and type models 140, word and phrase lists and models 125, and the results of examining the data in concordance form 120 all provide insight into the data and assist in refining the problem definition 130.

In some embodiments document clustering may be performed without the benefit of pre-defined document clusters. Initial document clusters may then be created using appropriate annotation interfaces, for example, the clustering review interface 66 and the category annotation interface 74, or the document annotation interface 62. Each of these interfaces provides various ways of looking at a set of documents and annotating that set. The results of the manual annotation are stored in the document management system 20. When document clustering does use preexisting clusters, these are embodied in prior annotations on the document and then stored in document management system 20. Word and phrase mining may be performed without the benefit of prior word and phrase lists. The seed words and phrases may then be identified by annotating documents in one of the annotation interfaces, such as the instance annotation interface 64, the document annotation interface 62, and the results are stored in the document management system 20.

In some embodiments word and phrase mining is performed on the basis of a preexisting gazetteer or one created by the developer according to early insight into the problem. In this case that gazetteer may be used to annotate the first set of documents in the larger development system, and the results embodied in annotations stored in the document management system 20.

In order to create a second set having at least one of a candidate document cluster or a candidate words and phrases list, logic is executed by the exploration engine 40, operating on data provided by the exploration resource manager 30 in communication with the document management system 20 and ontology management 25. In some embodiments evaluating the second set is performed based upon a set of predetermined factors in order to create a third set, where the third set includes at least one document semantically related to the candidate clusters or at least one semantically related word and phrase related to the candidate words and phrases that meet at least one of the predetermined factors.

The predetermined factors are subject to some configuration by the developer before a generation cycle executes. The configuration may then be performed by the developer in the query definition interface 38, stored in the query definitions repository 50, and available to the exploration engine 40 during processing by virtue of its communication with the query manager 45. In some embodiments selectively substituting the third set for the first set in a subsequent iteration of the method for exploring is managed by the exploration engine 40.

In some embodiments a difference between the supervised mode and unsupervised mode is that instead of applying the predetermined factors automatically to decide how to create the third set, the results of the processing may presented to the develop in the appropriate annotation interface, such as the clustering review interface 66 for document clustering tasks or the instance annotation interface 64 for word and phrase tasks. This may provide the developer an opportunity to modify the automatically generated results before defining the third set.

It will be apparent to one of skill in the art that described herein is a novel apparatus, system and method for exploring and organizing document collections. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A method for exploring and organizing a first electronic corpus of documents stored in a computer storage medium, the method comprising the steps of:
    performing at least one of reviewing the text of the documents from the first electronic corpus of documents in a concordance form, collecting terms from the first electronic corpus of documents in order to build semantically related terms, or collecting documents from the first electronic corpus of documents in order to build semantically related documents clusters;
    creating a first set, the first set having at least one category applying to at least one of the words and phrases in gazetteers, or at least one document in the semantically related document clusters;
    creating a second set, the second set having at least one of a candidate document cluster or a candidate words and phrases list;
    evaluating the second set based upon a set of predetermined factors in order to create a third set, where the third set includes at least one document semantically related to the candidate clusters or at least one semantically related word and phrase related to the candidate words and phrases that meet at least one of the predetermined factors; and
    selectively substituting the third set for the first set in a subsequent iteration of the method for exploring;
    where the performing step is performed in at least one of an unsupervised mode or a semi-supervised mode;
    further comprising the step of identifying contexts in which the first set of words and phrases occur;
    further comprising the step of formatting the contexts so that substantially similar candidate contexts are identified in the second corpus; and
    further comprising the step of using the formatted contexts and proposing additional candidate terms with their respective proposed category assignments, based on associations between known contexts, the candidate contexts generated relative thereto, and the terms for the first corpus.

2. The method according to claim 1 where the predetermined factors include a stopping condition.

3. The method according to claim 1 further comprising the step of using preexisting lists of terminology.

4. The method according to claim 1 further comprising the step of annotating words and phrases for membership in a predetermined set of categories in a predetermined number of training documents.

5. The method according to claim 1 further comprising the step of clustering documents for membership in a predetermined set of categories in a predetermined number of training documents.

6. The method according to claim 1 further comprising the step of identifying a first set of words and phrases in a second corpus of documents.

7. The method according to claim 1 further comprising the step of identifying a first set of document clusters in a second corpus of documents.

8. The method according to claim 1 further comprising the step of identifying contexts in which the first set of words and phrases occur.

9. The method according to claim 1 further comprising the step of identifying attributes of the first set of documents clusters.

10. The method according to claim 9 further comprising the step of formatting the contexts so that substantially similar candidate contexts are identified in the second corpus.

11. The method according to claim 10 further comprising the identification of document attributes so that substantially similar candidate document attributes are identified in the second corpus.

12. The method according to claim 11 further comprising the step of using the formatted contexts and proposing additional candidate documents with their respective proposed category assignments, based on associations between known contexts, the candidate contexts generated relative thereto, and the terms from the first corpus.

13. The method according to claim 11 further comprising the step of using the document attributes and proposed additional candidate documents and proposed respective document cluster assignments, based on associations between known document attributes, the candidate attributes generated relative thereto, and the documents from the first corpus.

14. The method according to claims 1 further comprising the step organizing the concepts into at least one of a semantic thesaurus and an ontology.

15. The method according to claim 1 further comprising the step of using words, phrases, or annotations of the documents to provide examples for review in a concordance graphical user interface.

16. The method according to claim 15 further comprising the step of using a structured knowledge source.

17. The method according to claim 16 further comprising the step using a query graphical user interface.

18. A computer system for exploring and organizing an electronic corpus of documents stored in a computer storage medium, the computer system comprising:
    an exploration resource module for managing the semantic exploration process;
    an exploration engine in communication with the exploration resource module
    a document management module in communication with the exploration resource module, the document management module for feeding document sets into the exploration resource module;
    an ontology management module in communication with the exploration resource module, the ontology management module for feeding and receiving sets of ontologies to and from the exploration resource module;
    a resource definitions database in communication with the exploration resource module, the resource definitions database for feeding and receiving sets of definitions into and from the exploration resource module;

a query manager module in communication with the exploration engine, the query manager module having access to a query definitions database and a query results database, the query manager module for feeding and receiving query information to and from the exploration engine, and an exploration interface in communication with the exploration engine, the exploration interface for displaying information related to the semantic exploration process.

19. The computer system according to claim 18 further comprising a set of predetermined ontologies, where the set of ontologies are directed into the exploration resource module via the ontology management module.

20. The computer system according to claim 18 further comprising at least one annotation interface, the annotation interface in communication with the exploration resource module.

* * * * *